United States Patent [19]

Ziegler

[11] Patent Number: 4,813,483

[45] Date of Patent: Mar. 21, 1989

[54] POST-STEAM ALKALINE FLOODING USING BUFFER SOLUTIONS

[75] Inventor: Victor M. Ziegler, Brea, Calif.

[73] Assignee: Chevron Research Company, San Francisco, Calif.

[21] Appl. No.: 184,521

[22] Filed: Apr. 21, 1988

[51] Int. Cl.[4] .................. E21B 43/22; E21B 43/24
[52] U.S. Cl. ............................ 166/274; 166/272; 166/273
[58] Field of Search ............ 166/274, 272, 273, 305.1, 166/271, 270

[56] References Cited

U.S. PATENT DOCUMENTS

| | | | |
|---|---|---|---|
| 3,386,506 | 6/1968 | Quance | 166/273 |
| 3,860,597 | 1/1975 | Palmer et al. | 166/274 |
| 3,880,237 | 4/1975 | Snavely, Jr. et al. | 166/272 X |
| 3,927,716 | 12/1975 | Burdyn et al. | 166/274 X |
| 3,929,190 | 12/1975 | Chang et al. | 166/273 X |
| 3,938,590 | 2/1976 | Redford et al. | 166/272 X |
| 3,951,827 | 4/1976 | Burroughs et al. | 166/312 X |
| 4,493,371 | 1/1985 | Reisberg et al. | 166/274 |
| 4,609,044 | 9/1986 | Lau | 166/274 X |
| 4,727,938 | 3/1988 | Lau | 166/274 X |

Primary Examiner—Stephen J. Novosad
Attorney, Agent, or Firm—S. R. La Paglia; E. J. Keeling; E. A. Schaal

[57] ABSTRACT

An enhanced oil recovery process is disclosed for formations that have been subjected to steam flooding. In that process, a weakly-alkaline (pH of less than 10) solution of sodium sesquicarbonate, sodium chloride salt, and an alpha olefin sulfonate dimer foaming agent is injected into the formation, then a nitrogen gas is injected into the formation to form in-situ foams for mobility control, and oil is recovered that is displaced by the sesquicarbonate solution and gas.

9 Claims, 14 Drawing Sheets

EFFECT OF CRUDE OIL CONCENTRATION ON
SODIUM CARBONATE (Na₂CO₃) PHASE BEHAVIOR

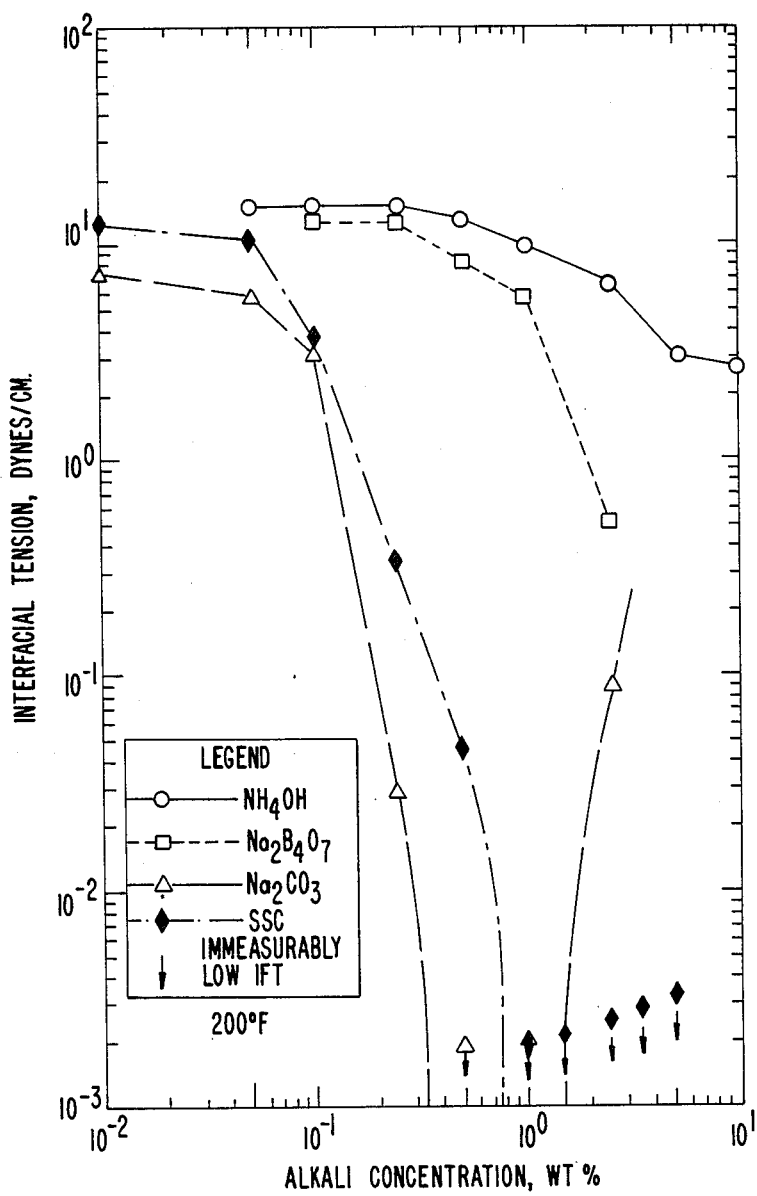
FIG._1.
OIL-WATER INTERFACIAL TENSION (IFT)
VS. ALKALI CONCENTRATION

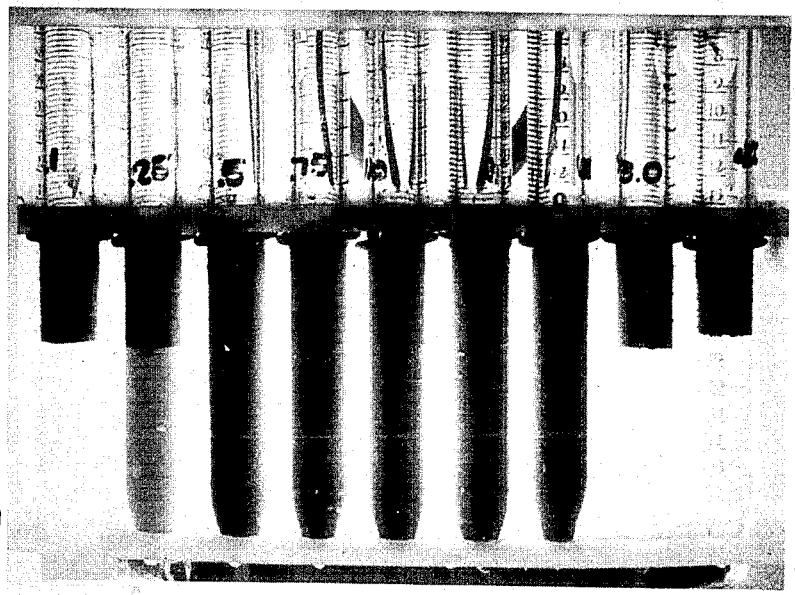
FIG._2a
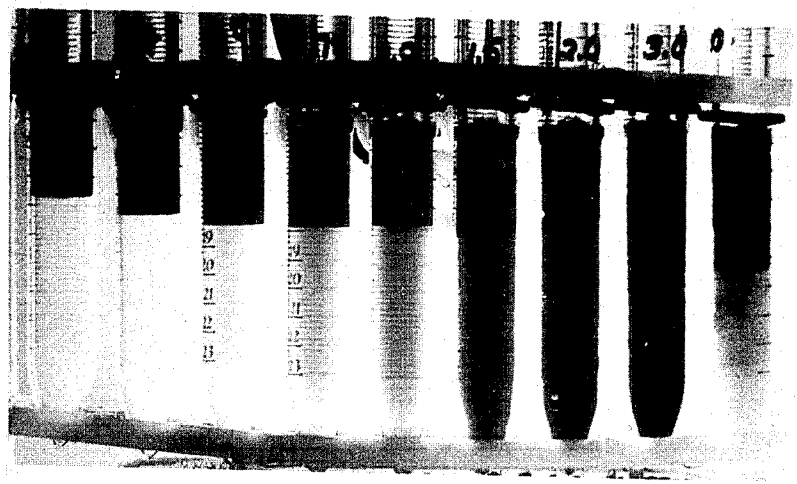
FIG._2b.
ALKALI SOLUTION-CRUDE OIL
PHASE BEHAVIOR

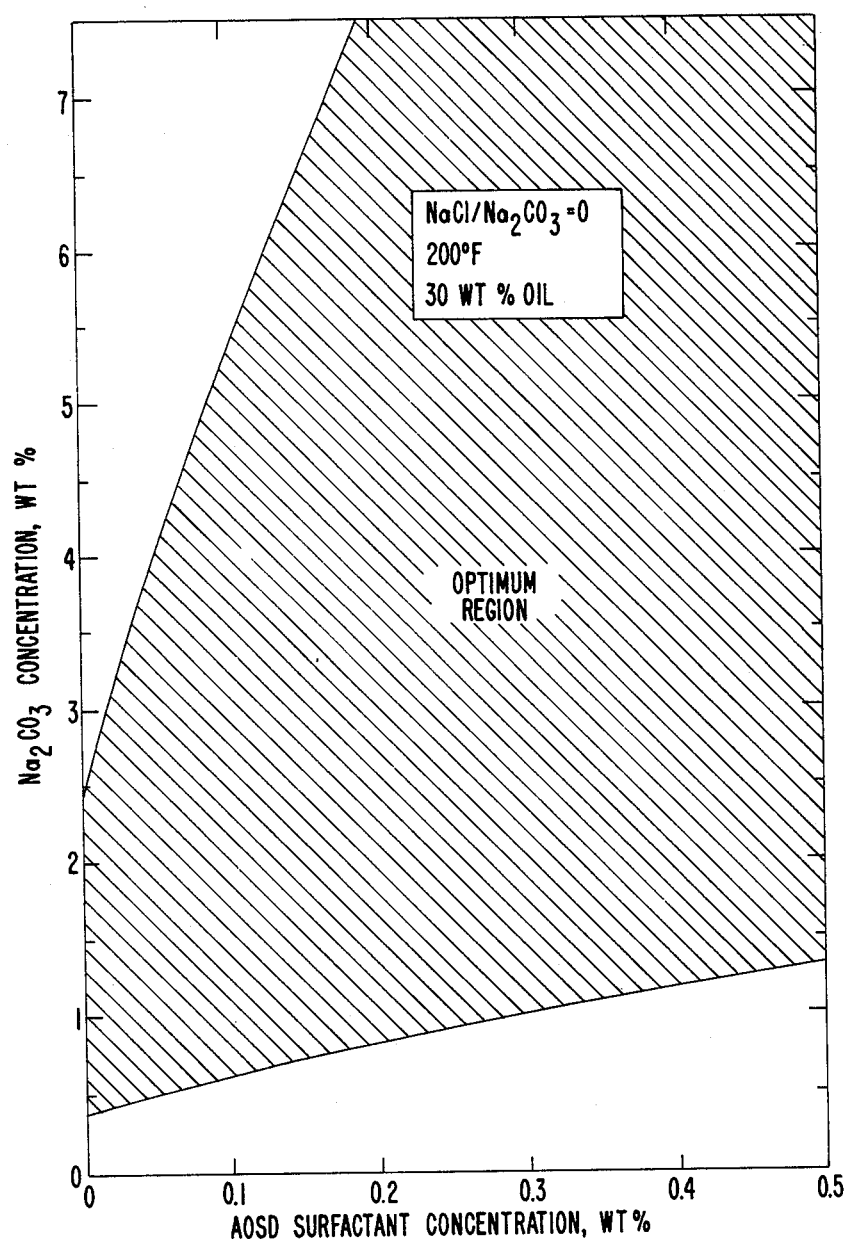
FIG.__3.
SODIUM CARBONATE ($Na_2CO_3$) SOLUTION - CRUDE OIL
PHASE BEHAVIOR MAP

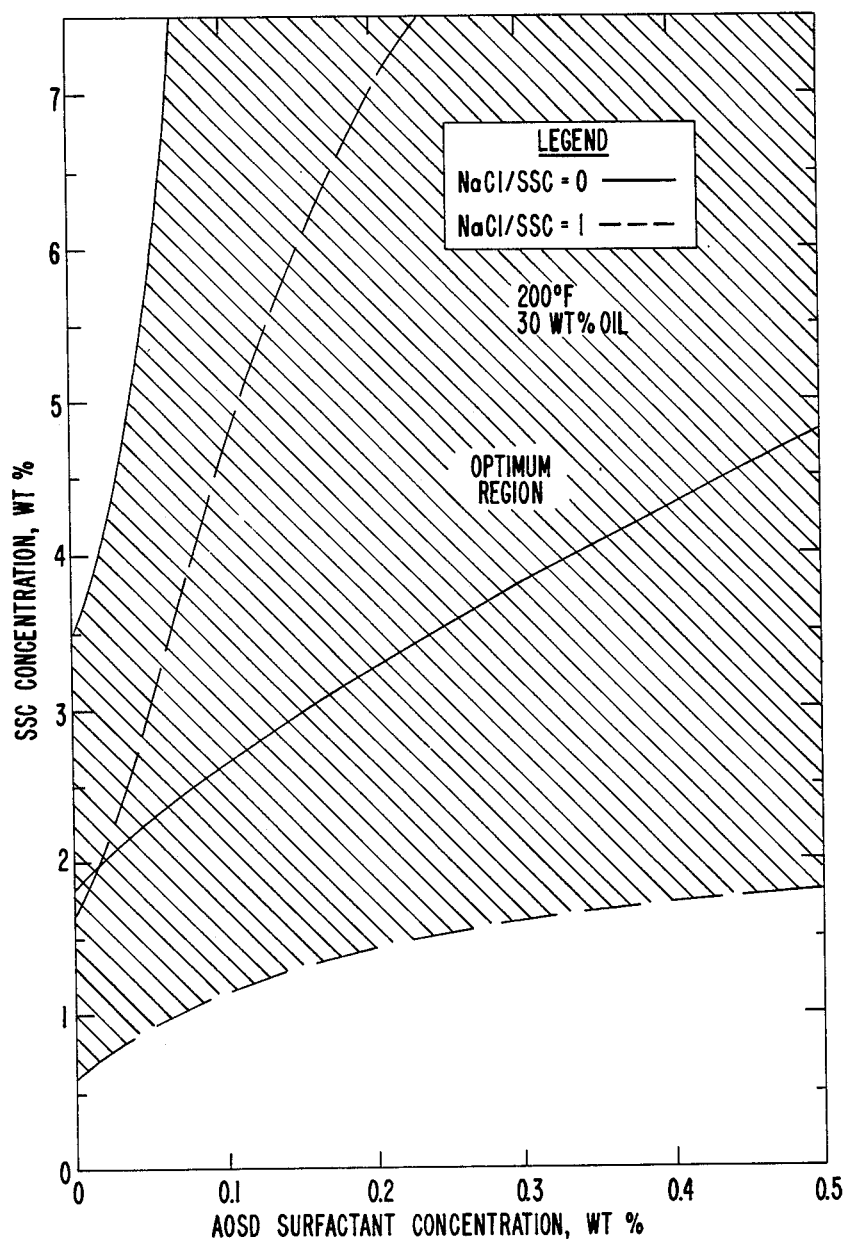
FIG._4.
SODIUM SESQUICARBONATE (SSC) SOLUTION—
CRUDE OIL PHASE BEHAVIOR MAP

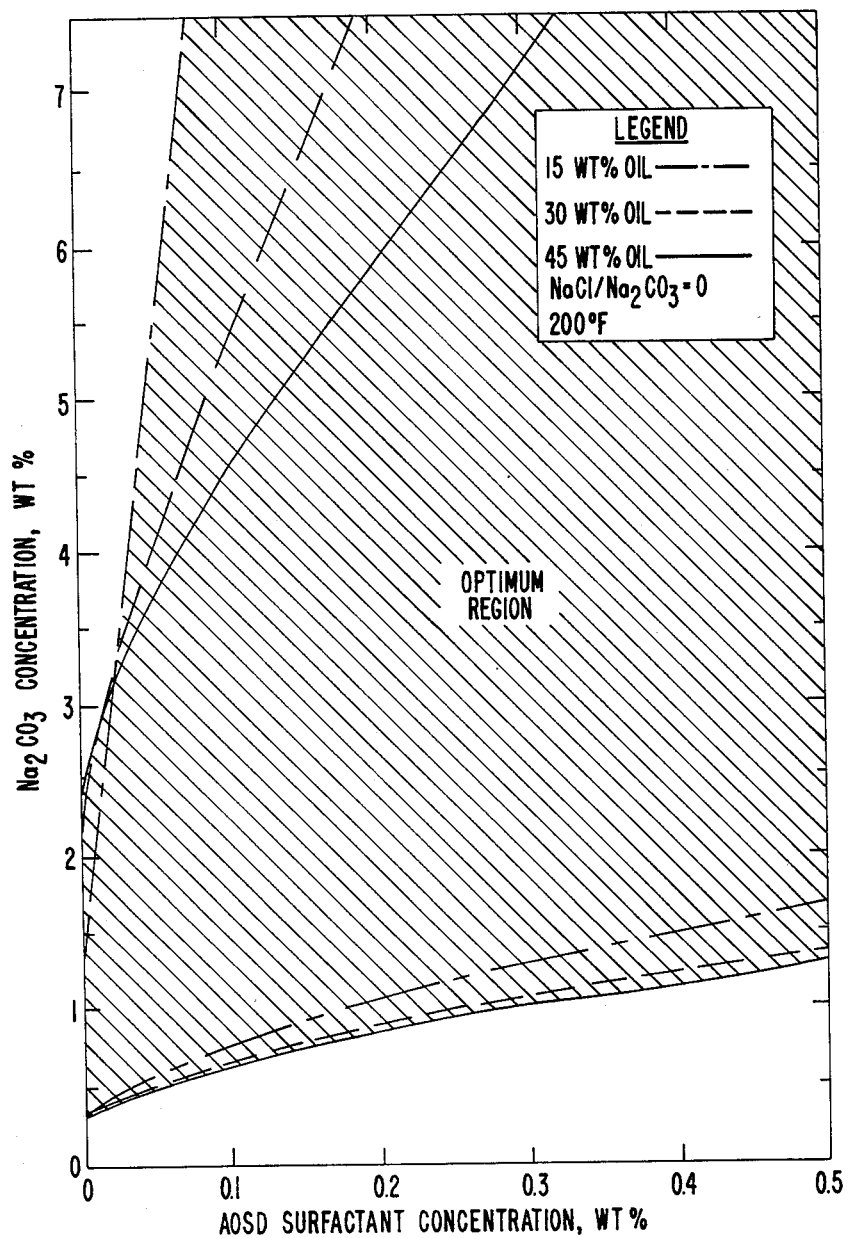
FIG._5.
EFFECT OF CRUDE OIL CONCENTRATION ON
SODIUM CARBONATE ($Na_2CO_3$) PHASE BEHAVIOR

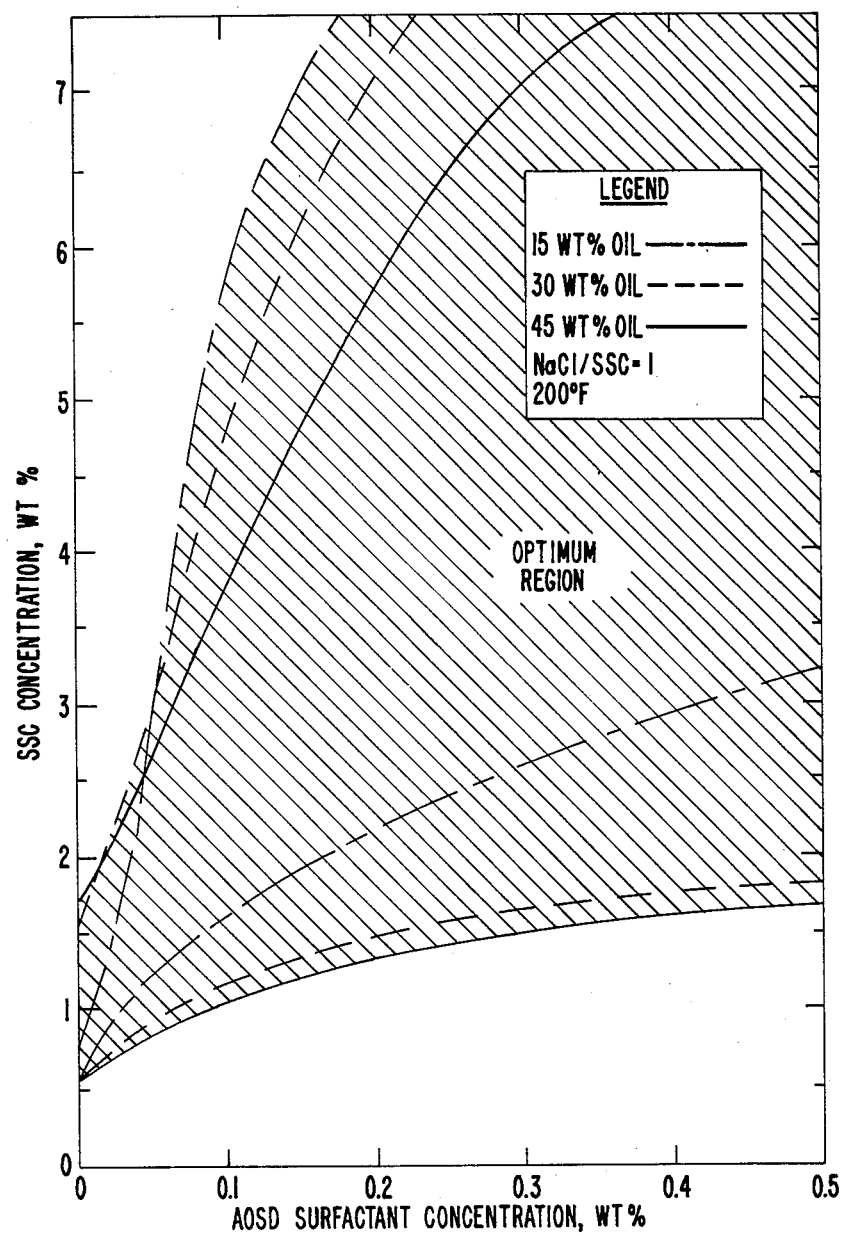
FIG.—6.
EFFECT OF CRUDE OIL CONCENTRATION ON
SODIUM SESQUICARBONATE (SSC) PHASE BEHAVIOR

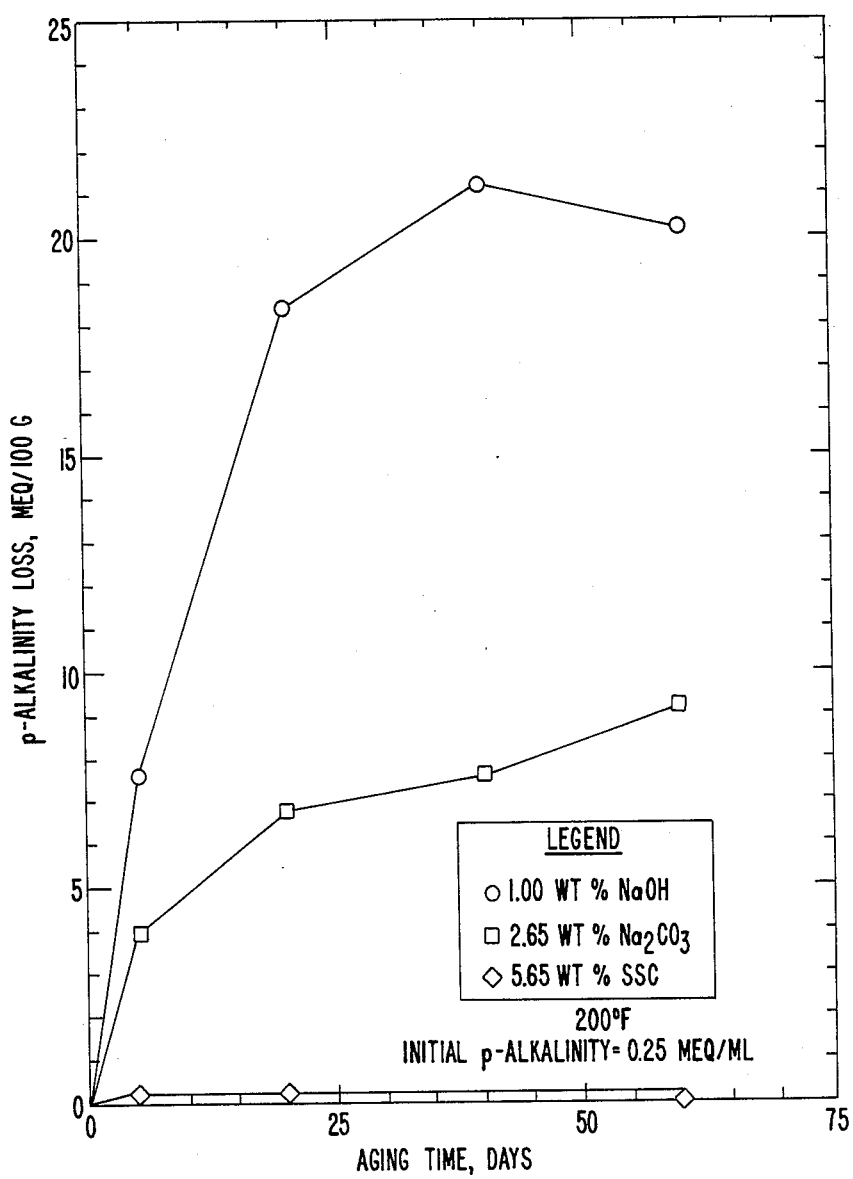
FIG._7.
LONG-TERM ALKALI CONSUMPTION:
p-ALKALINITY LOSS VS. AGING TIME

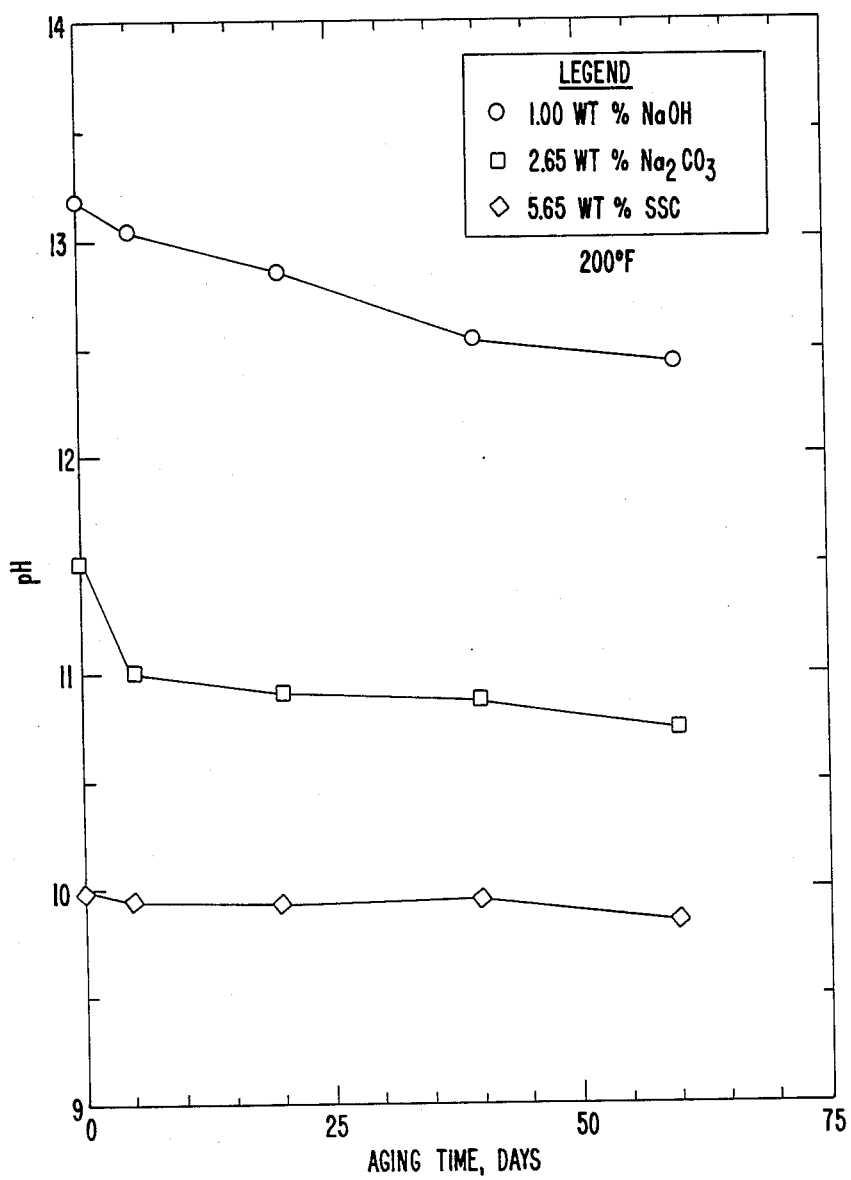
FIG._8.
LONG-TERM ALKALI CONSUMPTION:
pH VS AGING TIME

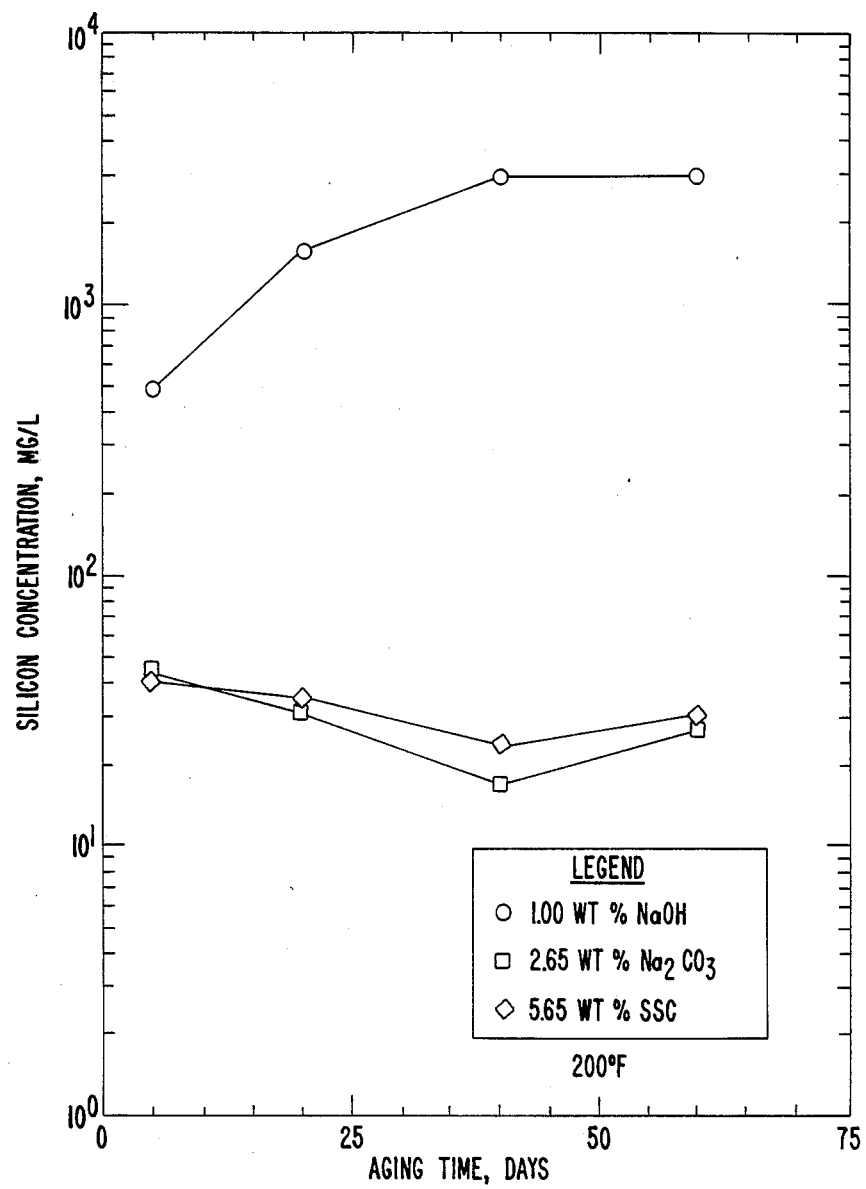
FIG._9.
LONG-TERM ALKALI CONSUMPTION:
SILICON CONCENTRATION VS AGING TIME

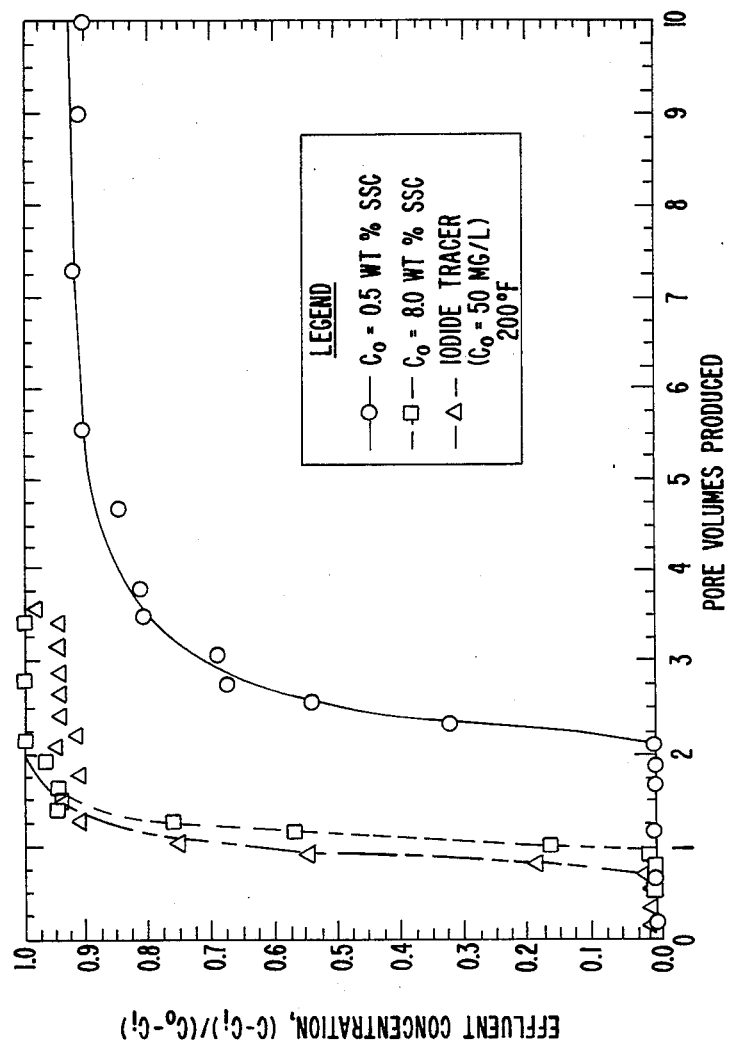
FIG._10.
SODIUM SESQUICARBONATE (SSC)
BREAKTHROUGH CURVES

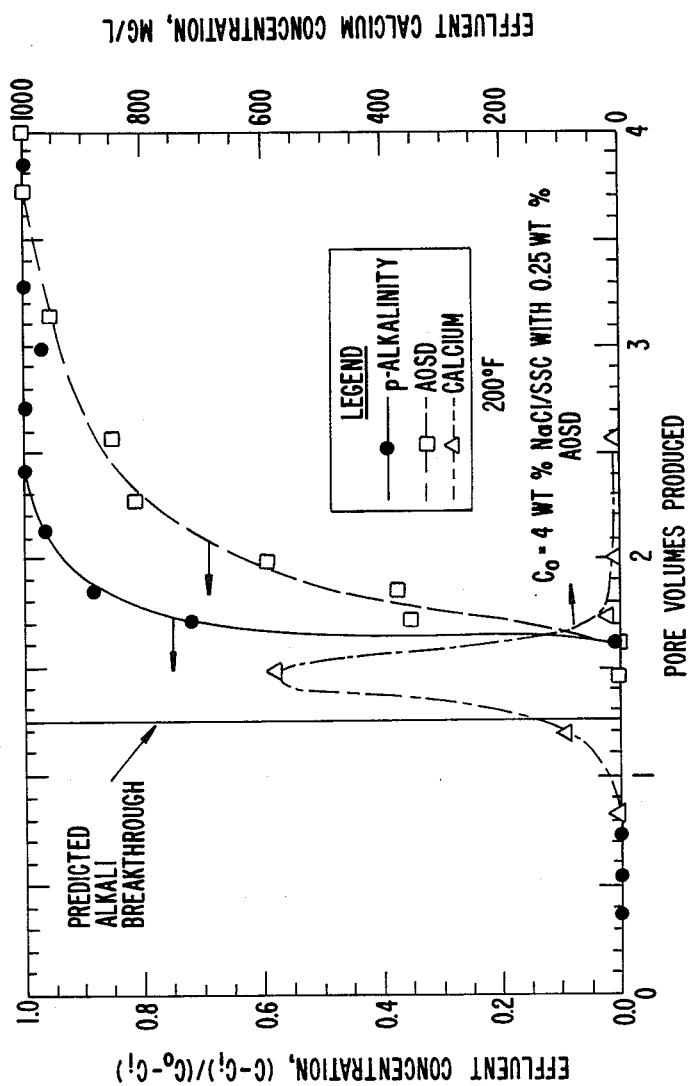
FIG.—11.
SODIUM SESQUICARBONATE (SSC)-AOSD
SURFACTANT CHROMATOGRAPHY

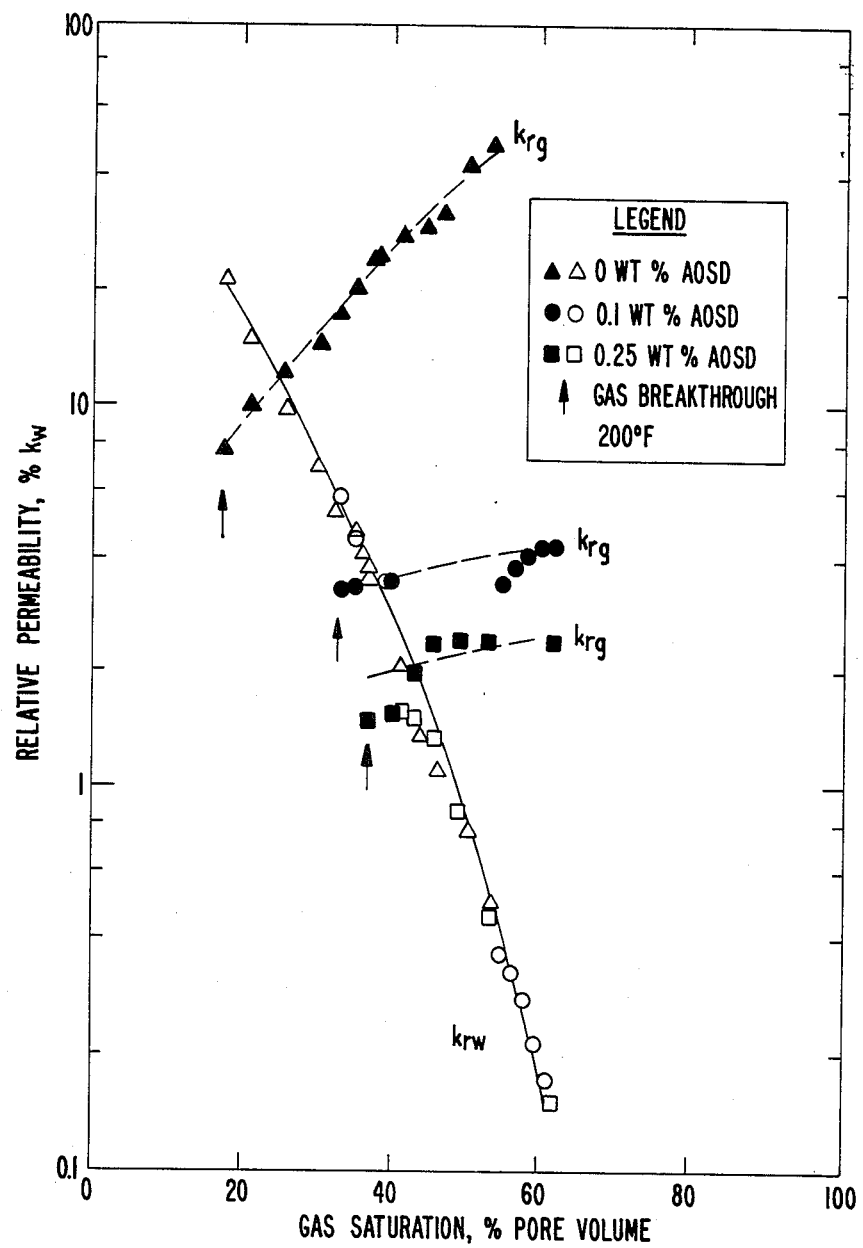
FIG._12.
GAS-LIQUID RELATIVE PERMEABILITIES

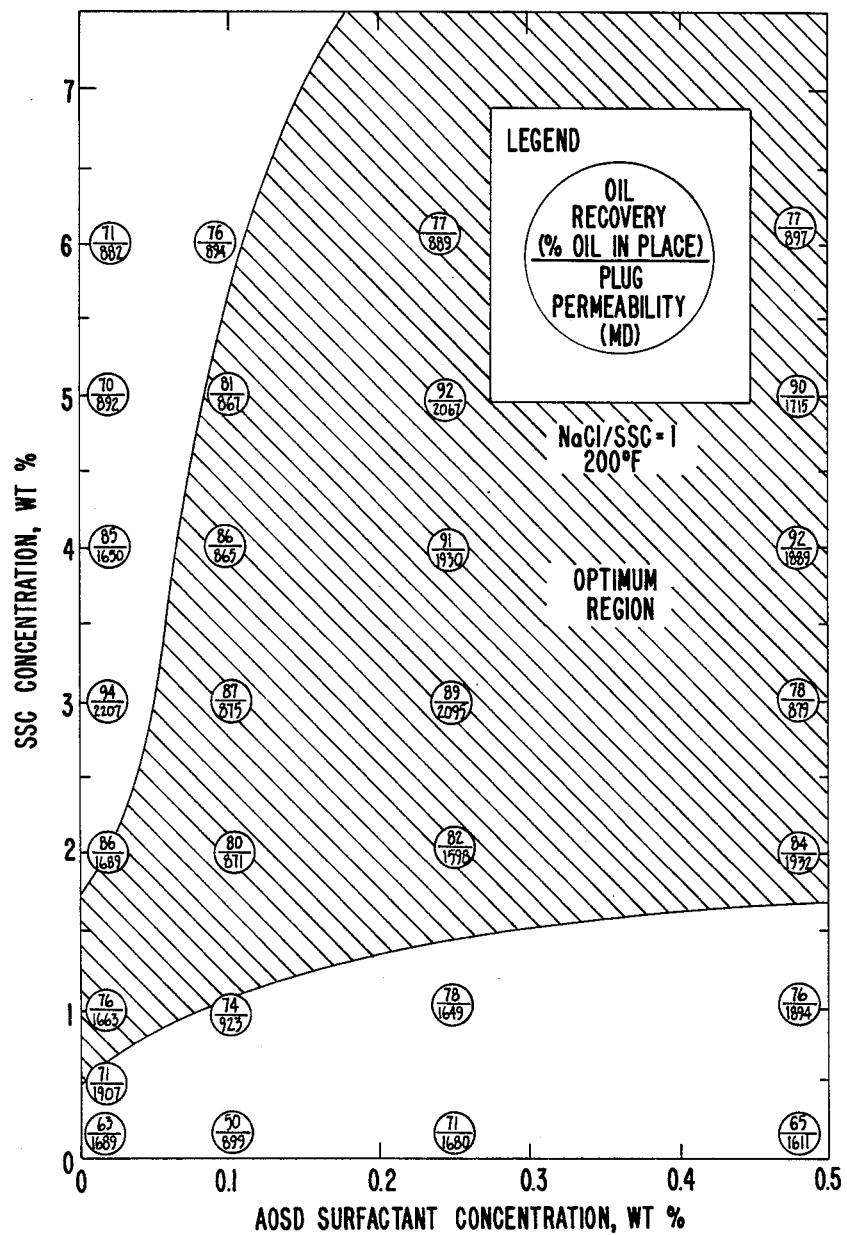
FIG._13.
CENTRIFUGAL OIL RECOVERIES:
SODIUM SESQUICARBONATE (SSC)-AOSD SURFACTANT SOLUTION

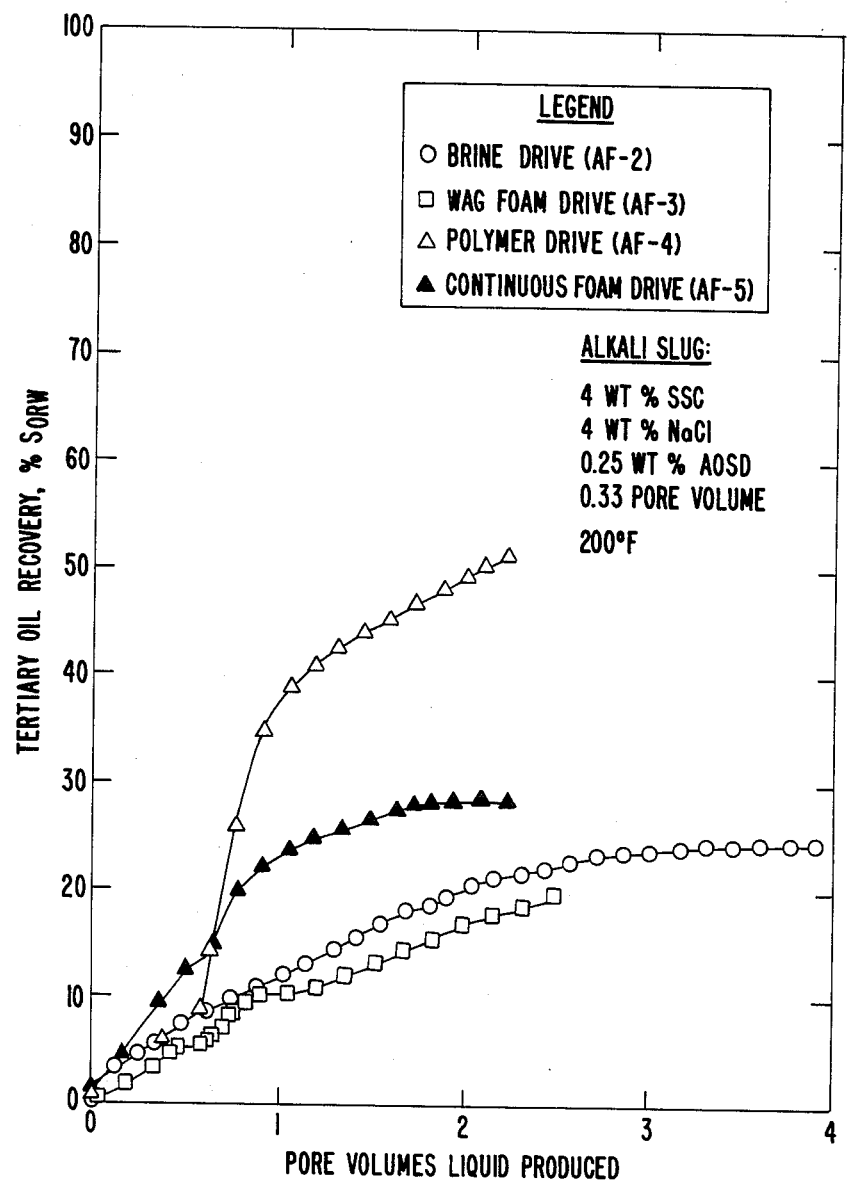
FIG._14.
SODIUM SESQUICARBONATE (SSC) COREFLOODS:
TERTIARY OIL RECOVERIES

POST-STEAM ALKALINE FLOODING USING BUFFER SOLUTIONS

The present invention relates to an enhanced oil recovery process for formations that have been steam flooded.

BACKGROUND OF THE INVENTION

Alkaline flooding is a water flooding process which relies on generating surfactants in situ to enhance oil recovery. Those surfactants are generated by neutralizing organic acids in crude oil with alkali. Those surfactants accumulate at interfaces within the porous medium. While several mechanisms have been proposed to explain how this works, they all rely on reducing the oil-water interfacial tension (IFT). Targets for alkaline flooding, therefore, include formations with acidic oils (i.e., oils with acid numbers greater than 0.05 mg KOH/g oil). Heavy-oil formations (°API <20) are especially attractive targets.

U.S. Pat. No. 4,493,371, which is incorporated herein by reference for all purposes, shows a process of recovering acidic oil from a formation. The oil is displaced with a mixture of gas and an alkaline solution that contains a cosurfactant. The acidic oil reacts with the alkaline solution to form monovalent cation soaps of low interfacial activity. The preferred alkaline component of that patent is NaOH.

There has been much research on the use of alkaline flooding as a follow-up process to steam flooding. Some features of steam-flooded, heavy-oil formations which make them attractive for alkaline flooding include: (1) the high interfacial activity of heavy oil against alkaline solutions, (2) the large amount of oil left in the formation after steam flooding, (3) the higher mobility of the oil caused by prior heating, (4) the small well spacing (i.e., less alkali residence time), (5) the shallow formation depth (i.e., lower well costs), and (6) the high permeability and low reservoir pressure (i.e., high injectivity). Drawbacks include high alkalinity losses and problems with controlling mobility in a nonisothermal reservoir.

Perhaps the most serious obstacle is high alkalinity losses. These losses may occur by ion exchange, precipitation, and rock dissolution. Of these three mechanisms, rock-dissolution appears to be the most severe. The dissolution reaction appears to follow first-or second-order kinetics with respect to hydroxide concentration. Therefore, raising the pH of the alkaline solution may not improve its transport through the formation.

SUMMARY OF THE INVENTION

The present invention solves this problem by using a weakly-alkaline solution (pH<10).

The present invention is an enhanced oil recovery process for formations that have been steam flooded. In that process, a weakly-alkaline solution (pH<10) containing a substantially neutral salt is injected into the formation. Then, a non-condensible gas is injected into the formation to form in-situ foams for mobility control. Then, the oil displaced by the solution and gas is recovered.

Preferably, the alkaline part of solution is sodium sesquicarbonate (SSC), sodium carbonate, sodium bicarbonate, or a mixture thereof. The salt is preferably either NaCl, $Na_2SO_4$, or a mixture thereof. The solution can also comprise a foaming agent, such as an alpha olefin sulfonate dimer (AOSD).

Preferably, the non-condensible gas is nitrogen. That gas can be injected concurrently or alternately with the solution.

BRIEF DESCRIPTION OF THE DRAWINGS

In order to facilitate the understanding of this invention, reference will now be made to the appended drawings of preferred embodiments of the present invention. The drawings are exemplary only, and should not be construed as limiting the invention.

FIG. 1 is a plot of oil-water interfacial tension vs. alkali concentration for various alkali systems.

FIGS. 2a and 2b are photographs showing the phase behavior of alkali-oil solutions.

FIG. 3 is a phase behavior map of sodium carbonate solution crude oil system.

FIG. 4 is a phase behavior map of sodium sesquicarbonate solution/crude oil system.

FIG. 5 is a phase behavior map of sodium carbonate solution/crude oil system showing the effect of crude oil concentration on phase behavior.

FIG. 6 is a phase behavior map of sodium sesquicarbonate solution/crude oil system showing the effect of crude oil concentration on phase behavior.

FIG. 7 is a plot of phenolphthalein (p)-alkalinity loss vs. aging time for various alkali solutions.

FIG. 8 is a plot of pH vs. aging time for various alkali solutions.

FIG. 9 is a plot of silicon concentration vs. aging time for various alkali solutions.

FIG. 10 is a plot of breakthrough curves for a sodium sesquicarbonate solution system.

FIG. 11 is a plot of surfactant chromatography for a sodium sesquicarbonate-AOSD system.

FIG. 12 is a plot of gas-liquid relative permeabilities for a sodium sesquicarbonate-AOSD system.

FIG. 13 is a plot of centrifugal oil recoveries for a sodium sesquicarbonate-AOSD system.

FIG. 14 is a plot of tertiary oil recoveries for a sodium sesquicarbonate-AOSD system.

DETAILED DESCRIPTION OF THE PREFERRED EMBODIMENTS

In its broadest aspect, the present invention is an enhanced oil recovery process that solves the problem of alkalinity losses by using a weakly-alkaline solution (pH<10) containing a substantially neutral salt. In that process, the weakly-alkaline solution and a noncondensible gas are injected into a formation to displace oil, and the oil so displaced is recovered. The noncondensible gas is used to form in-situ foams for mobility control.

The function of the weakly-alkaline solution is to form a surfactant in situ in the formation. That surfactant consists of soaps of petroleum acids. It is formed at the interface between the injected solution and the formation oil. In order to effectively displace the oil, there must be a very low interfacial tension between the surfactant and the oil. The oil should have an acid number of at least about 0.05 mg KOH/g oil and should form soaps of relatively high interfacial activity.

The alkaline solution must have a pH of less than 10. It contains an alkaline material, such as sodium sesquicarbonate ($Na_2CO_3 \cdot NaHCO_3 \cdot 2 H_2O$) (SSC), sodium carbonate ($Na_2CO_3$), sodium bicarbonate ($NaHCO_3$), and mixtures thereof. Preferably, it is sodium sesquicarbonate. Alternatively, it could comprise water-soluble salts of other inorganic weak bases which are capable of providing an alkalinity of less than 10.

The alkaline solution also contains a substantially neutral salt. That salt can comprise almost any water soluble, inorganic salt containing monovalent cations, which is stable at the reservoir temperature and which is substantially neutral with respect to alkali metal hydroxides. Preferably, it is NaCl, $Na_2SO_4$, or a mixture thereof.

Increasing the alkali concentration of a solution also increases that solution's total electrolyte concentration. Therefore, the amount of neutral salt should be lowered with higher alkaline material concentrations. Enough alkaline materials should be present to neutralize nearly all of the petroleum acids contained in the oil to be recovered.

The solution may also comprise surfactants. Suitable surfactants are surface active materials which are soluble in the alkaline solution. They comprise amphiphilic molecules in which the polar groups are sulfates, sulfonates, nitrates, carboxylates, phosphates, phosphonates, etc. The non-polar parts of such molecules can be aliphatic, aromatic or aliphatic-substituted aromatic hydrocarbon groups. Preferably, the surfactants are alpha olefin sulfonate dimers.

The non-condensible gas remains relatively inert and is neither significantly condensed nor dissolved at the reservoir temperature and pressure. That gas is injected into the formation to form in-situ foams for mobility control. Examples of such gases include nitrogen, air, methane, flue gas, combustion gas and the like. Preferably, it is nitrogen. The gas can be injected either concurrently or alternately with the alkaline solution.

In one embodiment of the present invention, a SSC solution having a pH of less than 10 is injected into a formation that has been team flooded. That solution contains a NaCl salt and an AOSD foaming agent. Nitrogen is injected into the formation to form in-situ foams for mobility control. The oil displaced by the solution and gas is then recovered.

EXAMPLES

The invention will be further illustrated by the following examples which set forth a particularly advantageous method and composition embodiments. While the examples are provided to illustrate the present invention, they are not intended to limit it.

A laboratory study was made of post-steam alkaline flooding using buffer solutions.

Fluids

Fluids produced from the Kern River Field were selected for use in this study. This field contains multiple heavy-oil reservoirs at various stages of steam flood development. Several of the reservoirs are under post-steam water injection.

Table 1 presents a chemical analysis of the synthetic brine used in this study. This brine was formulated from a geochemical analysis of softened steam generator feedwater. Reagent grade chemicals were used in preparing the brine. The brine was filtered (0.2 micron) and deaerated prior to use.

TABLE 1

| Synthetic Brine Composition | |
|---|---|
| Chemical | Concentration (ppm) |
| NaCl | 280. |
| KCl | 22.0 |
| $NaHCO_3$ | 318. |
| $Na_2SO_4$ | 93.0 |

Table 2 shows the properties of the crude oil used in this study. Its important properties are its low gravity, high acid number, and high viscosity. Following dehydration and filtration (2 micron), the oil sample was stored in a glass vessel and blanketed with nitrogen to prevent oxidation.

TABLE 2

| Oil Properties | |
|---|---|
| Gravity | 12.1 °API |
| Asphaltene Content (pentane insoluble) | 5.43 wt % |
| Acid Number (ASTM D664) | 2.89 mg KOH/g oil |
| Viscosity at 200° F. | 85.2 cp |

Chemical Additives

The alkaline chemicals used in this study were ammonium hydroxide, sodium borate, sodium carbonate, sodium sesquicarbonate (SSC), and sodium hydroxide. All alkalis except SSC were reagent-grade chemicals. The SSC was a purified sample of trona ore supplied by the FMC Corporation from their Green River, Wyo. deposit. Concentrated stock solutions were prepared by adding alkali to synthetic brine. Test solutions were prepared by dilution of the stock solutions. Phenolphthalein alkalinity was determined by potentiometric titration using a Mettler autotitrator. The pH was determined using an Orion pH meter.

The foaming surfactant used in this study was AOSD manufactured by Chevron Chemical under the trade name Chaser ® SD1000. It was supplied as a concentrated solution (about 40 wt %) and was used as received. AOSD solution concentration was colorimetrically determined using a dye-transfer technique.

Two polymers were used to provide mobility control during injection. These were Phillips' HEB (a copolymer of vinylpyrrolidone and acrylamide) and American Cyanamid's Cyanatrol-960 (a polyacrylamide). Phillips HEB is synthesized to be chemically resistant to high-temperature, high-hardness environments, and is approximately four times more expensive than Cyanatrol-960, a conventional polyacrylamide. HEB polymer was used with high-salinity brine. Cyanatrol-960 was used with low-salinity brine. Both polymers were supplied as concentrated slurries. Test solutions were prepared by dilution with synthetic brine in a Waring blender. The viscosity of the polymer solutions was measured as a function of temperature in a Haake roto-viscometer. A shear rate of 30 reciprocal seconds was used for making the viscosity measurements.

Porous Media

Berea sandstone and Kern River core material were used as the porous media for the displacement tests. Berea sandstone was fired at 850° F. overnight to deactivate clay minerals. Properties of fired Berea sandstone are shown in Table 3.

TABLE 3

| Mineral | Concentration (wt %) |
|---|---|
| Berea Sandstone Properties | |
| *Mineralogy* | |
| Quartz | 88 |
| Total Opal | 0+ |
| Calcite | 0+ |
| Dolomite | 0+ |
| K-Feldspar | 4 |
| Plagioclase Feldspar | 0+ |
| Total Clay | 7 |
| Anhydrite | 0+ |
| *Clay Characterization* | |
| Kaolinite | 43 |
| Illite | 54 |
| Smectite | 2 |
| Chlorite | 0 |
| Mixed Layer | 1 |

The Kern River core material was extracted with toluene and methanol prior to use. This unconsolidated core material was selected from the same reservoir sands that produced the crude oil used in this study. Table 4 presents the mineral composition and bulk properties of the Kern River sand.

TABLE 4

| Mineral | Concentration (wt %) |
|---|---|
| Kern River Sand Properties | |
| *Mineralogy* | |
| Quartz | 37 |
| Total Opal | 0+ |
| Calcite | 0+ |
| Dolomite | 0+ |
| K-Feldspar | 17 |
| Plagioclase Feldspar | 33 |
| Total Clay | 10 |
| Anhydrite | 0+ |
| *Clay Characterization* | |
| Kaolinite | 21 |
| Illite | 11 |
| Smectite | 66 |
| Chlorite | 0 |
| Mixed Layer | 2 |

Berea is quartzitic sandstone characterized by its low surface area and divalent cation exchange capacity. Kern River reservoir rock, on the other hand, contains a significant amount of smectite which contributes to high values of surface area (about 4×Berea) and divalent cation exchange capacity (about 14×Berea). Higher surface area and ion exchange capacity implies that chemical losses will be more severe in the reservoir rock than in Berea sandstone.

Post-Steamflood Reservoir Temperature

Previous results show that the reservoir temperature adjacent to the injection interval averaged 200° F. (±50° F.) during the early period of the post-steam water-flood. Therefore, all laboratory tests were conducted at 200° F.

Interfacial Activity Tests

The phase behavior of mixtures of reservoir oil, alkali, surfactant, polymer, and brine was evaluated in a series of test-tube experiments. In each test sequence, a constant mass fraction of oil was equilibrated with various amounts of alkali, surfactant, and brine in flame-sealed pipettes. Salinities were controlled by adding up to 7.5 wt % alkali and up to 7.5 wt % NaCl. When present, polymer concentration was fixed at 0.10 wt %. Following agitation to assure thorough phase contact, the pipettes were placed in an oven (200° F.) and allowed to stand until the phase volumes remained constant. This usually occurred within five days. The effects of alkali type, alkali concentration, AOSD concentration, brine salinity, and oil concentration were observed.

Interfacial tensions (IFT) between alkali solutions and reservoir oil were measured by the pendent drop and spinning drop methods. The spinning drop technique was used to determine the tensions between the upper and lower phases formed during the phase behavior tests. The pendent drop apparatus was used to evaluate the surface activity between alkali solution and oil under nonequilibrium conditions. Pendent drop measurements were made at a drop age of 10 seconds. The pendent drop method has, historically, been used as an alkaline flood screening technique. All IFT measurements were performed at 200° F.

Chemical Loss Tests

Static (i.e., batch-type) and dynamic (i.e., flow-type) tests were conducted to determine chemical losses by rock dissolution, $Na^+/H^+$ ion exchange, adsorption, and precipitation.

Static tests were performed to measure long-term alkali consumption by rock dissolution. These tests were conducted by equilibrating concentrated alkali solution (80 g) with Kern River sand (40 g) in Teflon-lined, acid digestion bombs at 200° F. The Kern River sand was pretreated with 10 wt % NaCl solution to help minimize alkalinity loss by divalent cation precipitation. Alkali consumption was determined from the change in solution alkalinity with equilibration time. Small samples (about 2 g) were used for the supernatant analyses in an effort to keep the liquid rock ratio reasonably constant over the duration of the test (60 days). In addition to solution alkalinity, the supernatant samples were subjected to elemental analysis (e.g., Si, Na, Ca, etc. . . . ) by inductively-coupled plasma (ICP) spectrometry.

Dynamic displacement tests were performed using a slim tube (Teflon—¼ inch diameter by 18 ft long) packed with Kern River core material to determine $Na^+/H^+$ ion exchange during alkali injection. After packing, the slim tube was coiled and inserted into a displacement apparatus. The slim tube was saturated with synthetic brine and flushed with a concentrated salt solution (15 wt % NaCl). This ensured that all clays were in the sodium form. A back pressure of 25 psig was maintained on the slim tube during the flow tests. Prior to performing the ion exchange tests, the saline pore fluid was replaced with synthetic brine. All ion exchange tests were performed at 200° F.

Step-input experiments were performed with sequentially increasing alkali concentrations. An iodide tracer was included in the alkali solutions to help determine the lag in alkali breakthrough. Injection at higher alkali concentrations was continued until the ion exchange plateau was reached. These tests were conducted at high frontal advance rates (about 29 ft/day) to minimize alkali consumption by rock dissolution. Frontal advance rate is the volumetric injection rate divided by the cross-sectional area of the pores. On a macroscopic basis, it corresponds to the Darcy velocity, v, divided by the porosity of the porous medium. Effluent alkalinities were determined by potentiometric titration. Effluent silicon, sodium, iodide, and calcium concentrations were measured by ICP spectroscopy. Ion exchange was determined by integration of the alkali breakthrough curves.

Following completion of the ion exchange tests, the alkaline pore fluid within the slim tube was replaced with synthetic brine. The slim tube was then reconditioned by injecting a 1 wt % $CaCl_2$ solution (about 2 pv) and over-flushing with large volumes of synthetic brine. This treatment returned calcium back to the clay surfaces.

The tendency for alkali and AOSD surfactant to chromatographically separate during transport through the reservoir was evaluated by simultaneously injecting the two chemicals into the reconditioned slim tube at 200° F. Effluent chemical concentrations were determined as a function of pore volumes injected. A high frontal advance rate (about 40 ft/day) was used in this test. Alkali and foaming surfactant losses were determined by integrating the chemical breakthrough curves.

Foam Relative Permeability Tests

Unsteady-state displacement tests were performed to determine gas and brine relative permeabilities in the presence of foaming surfactant.

Tests began by loading a Berea sandstone core (2-inch diameter by 12-inch length) into the core flood apparatus. The core was then flushed with 10 pore volumes of liquid (0 wt %, 0.1 wt %, or 0.25 wt % AOSD solution) at test temperature (200° F.). For the solutions containing surfactant, the effluent AOSD concentration was measured to ensure that it equaled the injection concentration. This ensured that the rock surface was in equilibrium with the bulk surfactant solution. The liquid permeability was then measured. This permeability served as the reference permeability for the relative permeability calculations. A back pressure of 300 psig was maintained on the core throughout the test sequence.

Humidified nitrogen was injected into the liquid-saturated core at constant pressure. The pressure drop across the core was regulated at 16 psi. Liquid and gas production were monitored as a function of time. The relative permeabilities to the gas and liquid phases were calculated by the method of Johnson et al. as described in "Calculation of Relative Permeability from Displacement Experiments," *Trans. AIME* (1959) Vol. 216, 370-372, which is incorporated herein by reference for all purposes.

At the completion of gas injection, the core was flushed with solvents (isopropanol and acetone), dried, and reused.

Oil Recovery Tests

Chemically-assisted oil recovery tests were performed using centrifugal and viscous displacement techniques. The centrifugal tests were used to rapidly evaluate the oil recovery capability of different alkali solutions. Corefloods were used to evaluate slug injection processes.

Centrifugal oil recovery tests were conducted using fired Berea sandstone plugs (1-inch diameter by 1-inch length). Each dry plug was saturated with Kern River oil and placed in a centrifuge cell used to perform imbibition tests on water-wet samples. The cells were filled with alkali solution and placed in a centrifuge heated to 185° F. After temperature equilibrium was obtained, the samples were subjected to a centrifugal acceleration 895 times that of the earth's gravity for 60 minutes. The volume of oil expelled from each plug was measured and the oil recovery was calculated as a percentage of the original oil in place.

Constant-rate alkaline floods were performed on previously hot waterflooded cores. The apparatus was configured such that water-alternating-gas (WAG) or simultaneous gas-liquid injection could be performed. Cores (2-inch diameter by 12-inch length) were mounted in a horizontal position. A back pressure of 100 psig was maintained on the cores during the 200° F. displacement tests. The standard procedure used to conduct the corefloods is outlined in Table 5.

TABLE 5

Standard Coreflood Procedure

*Core Preparation*
1. Load dry core into flooding apparatus.
2. Measure helium porosity and nitrogen permeability.
3. Evacuate core.
4. Saturate core with synthetic brine.
5. Increase back pressure to 100 psig.

*Initial Waterflood*
1. Increase core temperature to 200° F.
2. Flood with synthetic brine for approximately 7 pore volumes of throughput at a frontal advance rate of 10 ft/day.

*Oil Flood*
1. Inject 2 pore volumes of Kern River oil at 20 ft/day.
2. Collect effluents and measure volume of brine displaced.

*Waterflood*
1. Inject synthetic brine at 30 ft/day for 3 pore volumes.
2. Collect effluents and measure volume of oil displaced.

*Alkali Slug*
1. Inject 0.33 liquid pore volume alkali slug at 2.0-4.0 ft/day. (Frontal advance rate for simultaneous gas-liquid injection was 4.0 ft/day. Frontal advance rate for liquid or WAG injection was 2.0 ft/day.)
2. Collect effluents in fraction collector.

*Drive*
1. Inject about 3 pore volumes of drive fluid (brine or foam) at 2.0-4.0 ft/day. (Frontal advance rate for simultaneous gas-liquid injection was 4.0 ft/day. Frontal advance rate for liquid or WAG injection was 2.0 ft/day.)
2. Collect effluents in fraction collector.

After completion of the viscous displacement tests, collected effluents were centrifuged to break any produced emulsions. Initial and final saturations were determined by material balance of the collected effluents. Cores were discarded following completion of the displacement tests.

RESULTS

Interfacial Activity

Interfacial Tension

The interfacial activity of alkaline buffer solutions against Kern River oil was initially screened by measuring interfacial tension (IFT) by the pendent drop method.

Scans were made at 200° F. using four alkaline buffers (ammonium hydroxide, sodium borate, sodium carbonate, and sodium sesquicarbonate (SSC)). The test data, presented in FIG. 1, indicates that the carbonate buffers are very effective in reducing IFT to ultra low values ($<10^{-2}$ dynes/cm). $Na_2CO_3$ solution yielded immeasurably low IFTs over a concentration range from about 0.3 wt % to about 1.5 wt %. SSC solutions gave ultra low IFTs over the concentration range from about 0.75 wt % through 5.00 wt %. Data points corresponding to immeasurably low IFTs (i.e., drops would not form) were calculated assuming the drop diameter was equal to the needle diameter.

IFTs measured for the $NH_4OH$ and $Na_2B_4O_7$ solutions were in excess of 0.5 dynes/cm. IFTs less than $10^{-2}$ dynes/cm are required to mobilize residual oil at frontal advance rates representative of field conditions (about 1 ft/day). Based on this criterion, $NH_4OH$ and $Na_2B_4O_7$ were excluded from further evaluation.

Phase Behavior

Carbonate solutions equilibrated with Kern River oil formed stable emulsions over discreet ranges of alkali concentration. This behavior is illustrated in FIGS. 2a and 2b for solutions of $Na_2CO_3$ and SSC. As shown in this figure, gradually increasing alkali concentration from 0.1 wt % to 4.0 wt % caused a shift in phase behavior from under-optimum, through an optimum region (i.e., stable emulsions formed), to over-optimum. These emulsions were very fluid, which infers that water was the continuous phase. The alkali concentration at which emulsification occurred roughly corresponded to the beginning of immeasurably low IFTs determined by the pendent drop technique (see FIG. 1). From the trend in oil-water IFTs (spinning drop technique), it is inferred that the IFTs in the emulsified samples were ultra low ($<10^{-2}$ dynes/cm). This is in agreement with results obtained using NaOH solutions and Kern River oil. Comparing the phase behavior of the $Na_2CO_3$ and SSC systems, it is apparent that $Na_2CO_3$ generates regions of favorable interfacial activity over a broader range of alkali concentration than SSC.

Adding polymer (0.1 wt % Cyanatrol-960) to alkali solution did not appreciably affect phase behavior. Although adding polymer did improve the clarity of the lower phase and the speed the attainment of phase equilibrium, phase boundaries were not altered by its addition.

Adding AOSD foaming surfactant to alkali solution increased the range of alkali concentrations over which stable emulsions formed. This behavior is illustrated in FIG. 3 for the $Na_2CO_3$ system and FIG. 4 for the SSC system. The hachured area in each figure corresponds to the optimum region of phase behavior where stable emulsions were formed. Comparing FIGS. 3 and 4 it is apparent that $Na_2CO_3$ generates stable emulsions at much lower alkali concentrations than SSC (e.g., 1.0 wt % $Na_2CO_3$ vs. 3.5 wt % SSC at 0.25 wt % AOSD).

The concentration of alkali needed for optimum phase behavior can be reduced by adding salt (NaCl) to the alkali solution. This effect is shown in FIG. 4 for the SSC system. At an equal weight fraction of NaCl added to alkali (NaCl/SSC=1), the concentration of SSC needed for emulsification is reduced from 3.5 wt % (NaCl/SSC=0) to 1.5 wt % (NaCl/SSC=1) when 0.25 wt % AOSD surfactant is present in solution. The alkali requirement for the $Na_2CO_3$ was also reduced by adding salt to the aqueous phase. However, the reduction was not as dramatic as that for the SSC system, since the alkali requirement for the $Na_2CO_3$ system was initially low.

AOSD surfactant broadened the range of alkali concentrations over which emulsification occurred, but did not contribute to emulsion generation. This was deduced by mixing saline solutions of 0.10 wt % AOSD with Kern River oil. Samples having salinities ranging from 0.2 wt % NaCl to 8.0 wt % NaCl exhibited under-optimum phase behavior (i.e., clear lower phase with no indication of oil solubilization or emulsification). It is apparent that the surfactants formed by reaction of the alkali with organic acids in Kern River oil are responsible for the favorable interfacial activity observed during the phase behavior tests. AOSD functioned as a cosurfactant with respect to alkali solution/crude oil phase behavior.

The concentration of natural surfactants formed by neutralizing organic acids is directly proportional to the concentration of oil in the alkali/AOSD/brine/oil mixture. The effect of oil concentration (and, therefore, natural surfactant concentration) on phase behavior is presented in FIGS. 5 and 6 for the $Na_2CO_3$ and SSC systems, respectively. Results presented in these figures are very similar. That is, for systems without added AOSD surfactant, the electrolyte concentration required to pass from the optimum to over-optimum region increases with increasing oil concentration. This behavior is similar to that observed in conventional micellar systems where the salinity required to cause a phase change increases with increasing surfactant concentration. At AOSD concentrations from 0.1 wt % to 0.5 wt %, increasing oil concentration reduced the alkali concentration needed to cause a phase change. This reversal in behavior is a result of the much higher salinity requirement of AOSD ($>8$ wt % NaCl) as compared to the natural surfactant. Phase behavior results, similar to those reported here, have been previously observed for other alkali/crude oil systems.

The phase behavior maps shown in FIGS. 3–6 are effective tools for designing oil displacement tests. For continuous alkali injection tests, injection concentrations can be selected which fall within the optimum phase behavior region. For slug injection tests, injection and drive compositions can be selected so as to maximize the time that the alkaline slug remains in the region of favorable interfacial activity.

Chemical Losses

Even though an alkaline buffer solution can be formulated to provide favorable interfacial activity against crude oil, if the buffer solution will not propagate through the porous media because of excessive chemical losses, field implementation will not be practical. Chemical loss mechanisms which may have an adverse effect on an alkaline-foam process include:

(1) long-term alkali consumption by rock dissolution,
(2) alkali retardation by $Na^+/H^+$ ion exchange,
(3) alkali consumption by precipitation with divalent cations, and
(4) foaming surfactant retardation by adsorption.

Although other loss mechanisms may affect chemical transport during a post-steam chemical flood (e.g., surfactant thermal decomposition), these four mechanisms were presumed to be most important and were evaluated in a series of laboratory experiments.

Long-Term Alkali Consumption

To determine alkali losses, a reference alkalinity must be specified. Previous investigators have used solution pH values ranging from 3.2 to 10.0 as cutoff values for determining solution alkalinity by titration with a standardized acid. In this study, a pH of 8.3 was used as the cutoff value for determining solution alkalinity. This corresponds to the phenolphthalein alkalinity (p-alkalinity) of the solution. This cutoff value was selected for experimental convenience and because enhanced oil recovery has been reported for corefloods conducted using alkaline solutions with pH values as low as 8.6. The SSC solutions used in this study had pH values ranging from 9.2 to 10.0.

Long-term alkali consumption was determined from batch-type tests using three different alkaline solutions (1.00 wt % NaOH, 2.65 wt % Na$_2$CO$_3$, and 5.65 wt % SSC) equilibrated with Kern River sand. The initial p-alkalinity of each solution used in the tests was 0.25 meq/ml. Although the conditions in a closed reaction vessel may not accurately model the reservoir environment (i.e., open system), it was expected that the test data would be suitable for ranking the three alkalis in regard to their reactivity with Kern River sand at 200° F.

p-Alkalinity loss (meq/100 g rock) was most severe for the test conducted with NaOH and less severe when SSC solution was used. These results are detailed in FIG. 7 for each of the alkali solutions. Alkalinity loss from NaOH solution reached a plateau value of about 20 meq/100 g rock after aging in the presence of reservoir sand at 200° F. for 40 days. Loss of p-alkalinity from Na$_2$CO$_3$ solutions appeared to approach a limiting value of about 10 meq/100 g rock after 60 days aging. p-Alkalinity loss from SSC solutions peaked at 0.2 meq/100 g rock at five days of aging and remained constant thereafter.

Change in solution pH was most severe for the NaOH and Na$_2$CO$_3$ solutions used in the long-term aging tests. This effect is illustrated in FIG. 8. The pH of the supernatant NaOH solution showed a gradual decline from an initial value of 13.18 to 12.43 after 60 days of aging. The pH of the Na$_2$CO$_3$ solution showed a sharp drop during the first five days of aging and a gradual decline thereafter. The pH of the SSC solution dropped by only 0.12 units (9.97 to 9.85) during 60 days of equilibration at 200° F.

The corrosive effect of NaOH solution on reservoir sand at 200° F. is indicated by the high concentration of silicon detected in the supernatant (see FIG. 9). That concentration reached a plateau value of about 2940 mg/l after 40 days of aging. In contrast, the silicon content of the Na$_2$CO$_3$ and SSC solutions remained very low (20-40 mg/l) throughout the 60 day aging test.

The high alkali consumption from solutions of NaOH and Na$_2$CO$_3$ dictates against the use of these chemicals in post-steam alkaline flood. Because of its lower reactivity with reservoir rock relative to NaOH and Na$_2$CO$_3$, all further alkali loss measurements were conducted using SSC.

Sodium/Hydrogen Ion Exchange

Na$^+$/H$^+$ ion exchange delays alkali transport through reservoir sand. This retardation effect is illustrated in FIG. 10 where the SSC breakthrough curves from the dynamic ion exchange tests are plotted. As shown, breakthrough of a 0.5 wt % SSC solution is delayed by about 1.2 pore volumes (pv) relative to the iodide tracer front. Subsequent injection of 8.0 wt % SSC solution results in an additional lag (about 0.1 pv) in alkali breakthrough.

Na$^+$/H$^+$ ion exchange is a reversible process which corresponds to the following reaction:

$$MOH + Na^+ + OH^- =^{K_I} MONa + H_2O \quad (1)$$

where MO represents a hydrolyzable acid site on the mineral surface and K$_I$ is the equilibrium constant for the reaction. As indicated by Equation 1, Na$^+$/H$^+$ ion exchange will increase with increasing solution pH and is equivalent to the OH$^-$ ion uptake. Applying mass action principles, Bunge and Radke derived the following expression for Na$^+$/H$^+$ ion exchange:

$$q_{Na} = \frac{K_I A C_{Na} C_{OH}}{1 + K_I C_{Na} C_{OH}} \quad (2)$$

where
$q_{Na}$ = Na$^+$/H$^+$ ion exchange, meq/100 g rock
$K_I$ = Na$^+$/H$^+$ ion exchange equilibrium constant, (ml/meq)$^2$
$C_{Na}$ = Na$^+$ concentration, meq/ml
$C_{OH}$ = OH$^-$ concentration, meq/ml
A = Na$^+$/H$^+$ ion exchange capacity, meq/100 g rock.

When the solution pH remains constant, which is an adequate assumption for SSC solutions, Equation 2 reduces to a Langmuir-type isotherm. Solutions of SSC are extremely resistant to changes in pH because SSC supplies equimolar amounts of HCO$_3^{31}$ and CO$_3^=$ ions to solution. The buffering capacity of a chemical is greatest when equimolar amounts of conjugate acid (i.e., HCO$_3^-$) and conjugate base (i.e., CO$_3^=$) are present in solution.

Analysis of the breakthrough curves shown in FIG. 10 indicates that the Na$^+$/H$^+$ ion exchange capacity, A, of Kern River sand is significantly less than the divalent cation exchange capacity This analysis was performed by integrating the breakthrough curves to determine the Na$^+$/H$^+$ ion exchange and then simultaneously solving Equation 2 at each injection concentration for the Bunge-Radke isotherm constants, K$_I$ and A. Results of this analysis are presented in Table 6. As shown, the Na$^+$/H$^+$ ion exchange capacity is 1.85 meq/100 g rock for Kern River sand at 200° F. in concentrated SSC solution (pH of about 10). By comparison, the divalent cation exchange capacity of Kern River is 7.0 meq/100 g rock. Considering the low solubility of CaCO$_3$ (K$_{sp}$ about 10$^{-8}$), this implies that alkalinity loss by divalent cation precipitation may have a much greater effect on alkali propagation than Na$^+$/H$^+$ ion exchange.

TABLE 6

| | Summary of Ion Exchange Tests | | | |
|---|---|---|---|---|
| SSC Concentration (wt %) | p-Alkalinity (meq/ml) | Sodium Concentration (meq/ml) | Hydroxide Concentration (meq/ml) | Sodium/ Hydrogen Ion Exchange (meq/100 g) |
| 0.50 | 0.0218 | 0.0653 | 7.41 × 10$^{-5}$ | 0.690 |
| 8.00 | 0.391 | 1.17 | 7.94 × 10$^{-5}$ | 1.70 |
| | | Average = | 7.68 × 10$^{-5}$ | |

Bunge-Radke Isotherm Constants:
K$_I$ = 1.18 × 10$^5$ (ml/meq)$^2$
A = 1.85 meq/100 g rock

Alkali/Surfactant Chromatography

The tendency for SSC and AOSD surfactant to separate during flow through Kern River sand is illustrated in FIG. 11. In this test a saline solution of the two chemicals (4 wt % SSC—4 wt % NaCl—0.25 wt % AOSD) was continuously injected into the slim tube used for the ion exchange tests. The slim tube had been reconditioned by injecting a 1 wt % Ca$_2$Cl solution (about 2 pv) and overflushing with large volumes of synthetic brine. This treatment returned calcium back to the clay surfaces. Using the Bunge-Radke isotherm constants determined from the ion exchange tests, alkali breakthrough was predicted to occur after 1.25 pore volumes of throughput. Actual alkali breakthrough occurred after 1.65 pore volumes of throughput. Prior to alkali breakthrough, high levels of calcium (about 575 mg/l) were detected in the effluent. The probable source of this calcium was the clay material in the reservoir sand, which exchanged its $Ca^{++}$ ions for $Na^+$ ions in the concentrated alkali solution. Once the calcium concentration in the effluent subsided, alkali breakthrough occurred. It was inferred that the additional delay in alkali breakthrough could be attributed to alkali loss by precipitation of calcium carbonate. As shown in Table 7, the calculated alkalinity loss by precipitation (1.57 meq/100 g rock or 17,840 lb/acre-ft) was about 50% greater than the loss predicted to occur only by $Na^+/H^+$ ion exchange (0.981 meq/100 g rock or 11,155 lb/acre-ft).

TABLE 7

Summary of Sodium Sesquicarbonate - AOSD Surfactant Chromatography Test

Measured p-Alkalinity Loss = 2.55 meq/100 g rock = 28,995 lb/acre-ft
Predicted p-Alkalinity Loss = 0.981 meq/100 g rock = 11,155 lb/acre-ft
p-Alkalinity Loss by Precipitation = 1.57 meq/100 g rock = 17,840 lb/acre-ft
AOSD Loss = 46.1 meq/100 g rock = 2,320 lb/acre-ft Breakthrough of the AOSD surfactant front (i.e., effluent concentration=0.50) occurred about 0.2 pore volumes after SSC breakthrough (see FIG. 11). The impact that this chromatographic separation would have on an alkaline-foam process will depend on the level of dispersion in the flow system. Any lag in AOSD surfactant transport relative to sesquicarbonate, may reduce recovery efficiency by altering phase behavior (i.e., toward over-optimum) and reducing foamability (i.e., mobility control). The AOSD loss determined by integrating the surfactant breakthrough curve was 46.1 meq/100 g rock (about 2,320 lb/acre-ft).

Foam Relative Permeability

The effect of foaming surfactant on gas-brine relative permeabilities was evaluated in a series of gas-drive tests. Results of these tests are presented in FIG. 12. As shown, adding surfactant to the liquid phase, reduced gas relative permeability and delayed gas breakthrough from initially brine-saturated cores. The reduction in gas permeability and delay in breakthrough are attributed to the generation of a "foam-like" dispersion of gas and liquid within the porous medium. For convenience, the term "foam" is used in this study to describe mixtures of gas and surfactant solution, regardless of the configuration of the individual phases. Previous investigators have observed behavior similar to that shown in FIG. 12 for gas-liquid systems containing surfactants.

For gas-liquid systems which contained surfactant, gas relative permeability was essentially constant with increasing gas saturation (see FIG. 12). This behavior implies a non-Darcy type of gas flow. Flow of discontinuous pockets of gas interspersed between lamellae of surfactant solution may correspond to the calculated permeability behavior.

Increasing the concentration of surfactant enhanced the gas-blocking effect of the in situ-generated foam. Adding 0.10 wt % of AOSD surfactant to the synthetic brine, reduced the endpoint (i.e., maximum) gas relative permeability by an order of magnitude (50% $k_w$ to 5% $k_w$). Increasing the AOSD concentration to 0.25 wt % further reduced the endpoint gas relative permeability by a factor of two (5% $k_w$ to 2.5% $k_w$).

Relative permeabilities to the liquid phase, calculated from the gas-liquid displacement data, were insensitive to the concentration of foaming surfactant in solution (see FIG. 12). This observation is in agreement with results of previous studies. The initial liquid permeability at the start of each displacement test ranged from 440 md to 460 md. This indicates that the core cleaning technique used in this test sequence did not damage core permeability.

Oil Recovery Centrifugal Displacements

Results of the centrifugal displacement test indicate that SSC/AOSD solutions which yielded favorable phase behavior with Kern River oil also gave high oil recoveries. This is illustrated in FIG. 13, where the oil recovery data is superimposed on the SSC/AOSD phase behavior map (see FIG. 6). The hachured area in FIG. 13 corresponds to the region of favorable interfacial activity determined from phase behavior tests. Oil recoveries from the favorable activity area ranged from 76 to 92 percent of the oil in place (% OIP), with an average of 84% OIP. Oil recoveries from the over-optimum and under-optimum regions averaged 80% OIP and 68% OIP, respectively.

Results of the centrifuge tests indicate that oil recovery was dependent upon the permeability of the test plug. As shown in FIG. 13, plugs with high permeabilities in the interfacially active region tended to have higher oil recovery than lower permeability plugs. The combined effects of interfacial activity and permeability on centrifugal oil recovery can be best understood by considering the Bond number, $N_B$:

$$N_B = \frac{\Delta \rho \, g \, k}{\delta} \quad (3)$$

where
$\Delta \rho$ = fluid density difference
$g$ = gravitational acceleration
$k$ = permeability
$\delta$ = interfacial tension The Bond number is the dimensionless ratio of gravitational forces to interfacial forces. For gravity displacements, increasing the Bond number increases the recovery of the displaced phase. In this respect, the Bond number is analogous to the capillary number ($N_c = \mu v/\delta$) in viscous displacements. Increasing plug permeability and reducing the interfacial tension between the alkali solution and crude oil, therefore, will increase the Bond number. If the increase is sufficiently large, high recovery will result. A Bond number greater than $3 \times 10^{-5}$ is required before enhanced recovery of the nonwetting phase occurs. For comparison, a centrifuge test conducted on a 1 darcy sandstone plug using Kern River oil and synthetic brine ($\delta = 13.9$ dynes/cm) corresponds to a Bond number of $1.7 \times 10^{-5}$. Possible changes in plug wetability during the centrifuge tests (i.e., oil-wet to water-wet), may have had an effect on the critical Bond number required for enhanced oil recovery. Residual nonwetting phase saturation vanishes at Bond numbers on the order of $10^{-3}$.

Centrifugal displacement is a convenient method for evaluating the displacement efficiency which can be obtained with a chemical flooding solution. Since chemical solution is continuously injected during the centrifuge test, slug or gradient injection processes cannot be evaluated by this technique. Oil recovery by alkaline slug injection must be determined in a coreflood experiment.

Corefloods

Seven corefloods were performed to evaluation oil recovery by alkaline slug injection. In these tests, concentrated alkaline slugs were injected into Berea cores at waterflood residual oil saturation. The alkaline slugs were displaced with low-salinity drive fluid (brine, polymer solution, or foam). All slug compositions were formulated to provide favorable interfacial activity against Kern River oil (see FIG. 4) during injection and upon subsequent dilution with low-salinity connate brine and drive fluids. Results of the corefloods are presented in Table 8.

The initial two sesquicarbonate corefloods (AF-1 and AF-2) evaluated the effect of phase behavior on tertiary oil recovery. No mobility control additives were included in the solutions for these floods. The alkaline slug in AF-1 (2 wt % SSC and 2 wt % NaCl) contained no AOSD surfactant and, as formulated, would exhibit over-optimum phase behavior when mixed with Kern River oil (see FIG. 6). Dilution of the alkali during displacement by synthetic brine, however, would cause the slug to traverse the interfacially active region of the phase behavior map shown in FIG. 6.

the slug to traverse the interfacially active region of the phase behavior map shown in FIG. 6.

By comparison, the alkali slug from AF-2 contained AOSD surfactant, and was formulated to yield optimum phase behavior when mixed with crude oil. Based on its initial composition (4 wt % SSC-4 wt % NaCl-0.25 wt % AOSD), the alkali slug in AF-2 was expected to maintain favorable interfacial activity for a greater distance than the alkali slug in AF-1 (i.e., the dilution path for AF-2 traverses a greater concentration range within the optimum phase behavior region in FIG. 9 than the dilution path for AF-1). Tertiary oil recoveries from AF-1 and AF-2 were 4.8% pv and 7.8% pv, respectively. Oil production from these floods occurred as very dilute oil-in-water emulsions (i.e., oil content <10 volume percent). These results indicate that increasing the distance over which the alkali slug maintains favorable interfacial activity against Kern River oil, will increase coreflood oil recovery.

Incorporating effective mobility control into the coreflood design enhanced tertiary oil recovery. Three methods of providing mobility control were tested. These were: (1) addition of polymer to increase the viscosity of the aqueous phase, (2) in situ foam generation by alternate injection of gas and surfactant solution (WAG), and (3) injection of preformed foam. Results obtained using these mobility control techniques with the alkali slug composition from flood AF-2 are presented in Table 8 (floods AF-3, AF-4, and AF-5).

Comparison of flood performance indicates that tertiary oil recovery was highest for the flood conducted

TABLE 8
SUMMARY OF COREFLOOD RESULTS

| Flood ID | Core Air Permeability (md) | Frontal Advanced Rate (ft/day) | Alkali Slug Composition[2] SSC (wt %) | NaCl (wt %) | AOSD (wt %) | Polymer (wt %) | Liquid Slug Size (pv) | Nitrogen[3] Liquid Ratio |
|---|---|---|---|---|---|---|---|---|
| AF-1 | 832 | 2 | 2.00 | 2.00 | — | — | 0.33 | 0 |
| AF-2 | 832 | 2 | 4.00 | 4.00 | 0.25 | — | 0.33 | 0 |
| AF-3 | 835 | 2 | 4.00 | 4.00 | 0.25 | — | 0.33 | 1:1(WAG) |
| AF-4 | 729 | 2 | 4.00 | 4.00 | 0.25 | 0.50[5] | 0.33 | 0 |
| AF-5 | 841 | 4 | 4.00 | 4.00 | 0.25 | — | 0.33 | 1:1 |
| AF-6 | 863 | 2 | 5.00 | — | — | 0.25[5] | 0.35 | 0 |
| AF-7 | 863 | 4 | 5.00 | — | 0.10 | — | 0.35 | 1:1 |

| Flood ID | Drive Composition[2] AOSD (wt %) | Polymer (wt %) | Brine | Liquid Slug Size (pv) | Nitrogen[3] Liquid Ratio | $S_{oi}$ (% pv) | $S_{orw}$ (% pv) | $S_{orc}$ (% pv) | Tertiary Recovery (% pv) | (% Sorw) | Incremental[4] Chemical Costs (S/bbl oil) |
|---|---|---|---|---|---|---|---|---|---|---|---|
| AF-1 | — | — | only | 3.21 | 0 | 65.4 | 26.3 | 21.5 | 4.8 | 18.3 | 6.26 |
| AF-2 | 0.10 | — | — | 0.67 | 0 | 62.4 | 31.7 | 23.9 | 7.8 | 24.6 | 16.76 |
|  | — | — | only | 2.96 | 0 |  |  |  |  |  |  |
| AF-3 | 0.10 | — | — | 0.67 | 1:1 (WAG) | 78.1 | 38.6 | 30.8 | 7.8 | 20.2 | 19.08 |
|  | — | — | only | 1.00 | 0 |  |  |  |  |  |  |
| AF-4 | — | 0.25[6] | — | 1.67 | 0 | 75.0 | 40.6 | 19.6 | 21.0 | 51.7 | 22.68 |
|  | — | — | only | 0.30 | 0 |  |  |  |  |  |  |
| AF-5 | 0.10 | — | — | 1.36 | 1:1 | 77.5 | 42.3 | 30.3 | 12.0 | 28.4 | 16.16 |
|  | — | — | only | 0.62 | 0 |  |  |  |  |  |  |
| AF-6 | — | 0.10[6] | — | 1.67 | 0 | 82.1 | 42.2 | 26.9 | 15.3 | 36.2 | 15.83 |
|  | — | — | only | 1.00 | 0 |  |  |  |  |  |  |
| AF-7 | 0.10 | — | — | 1.31 | 1:1 | 78.0 | 41.6 | 28.2 | 13.4 | 32.1 | 12.67 |
|  | — | — | only | 1.05 | 0 |  |  |  |  |  |  |

[1]All floods conducted at 200° F. using fired Berea sandstone cores.
[2]Solvent is synthetic brine (Table 1).
[3]Nitrogen rate determined at mean pressure of 150 psia.
[4]Unit chemical costs:
SSC = $0.10/lb
HEB polymer = $4.00/lb
NaCl = $0.03/lb
Cyanatrol-960 polymer = $1.00/lb
AOSD = $1.35/lb
Nitrogen = $4.00/MSCF
[5]HEB polymer
[6]Cyanatrol-960 polymer using polymer for mobility control (see FIG. 14). Oil recovery incremental to that obtained from the base flood without mobility control (AF-2) was 13.2% pv for the polymer-assisted alkaline flood (AF-4). Incremental oil recoveries from the WAG flood (AF-3) and the preformed foam test (AF-5) were 0% pv and 4.2% pv, respectively. As shown in FIG. 14, oil recovery from the polymer-assisted flood rose sharply after injection of the alkali slug. The fractional flow of oil, $f_o$, approached 0.4 during this portion of the flood. This indicates that the polymer improved mobility control and was able to bank oil mobilized by the alkali slug. Emulsion production during this test was minimal. In contrast, oil production during the WAG- and foam-assisted injection tests occurred as very stable oil-in-water emulsions ($f_o < 0.20$).

While the WAG- and foam-assisted injection tests were successful in reducing injected fluid mobility, they were not as effective as the polymer-augmented system in enhancing coreflood oil recovery. As shown in Table 8, however, the WAG- and foam-assisted injection tests (AF-3 and AF-5) did recover oil at a lower chemical cost than the polymer-augmented coreflood (AF-4).

While the present invention has been described with reference to specific embodiments, this application is intended to cover those various changes and substitutions which may be made by those skilled in the art without departing from the spirit and scope of the appended claims.

What is claimed is:

1. An enhanced oil recovery process for formations that have been subjected to steam flooding, said process comprising:
   (a) injecting into said formation an alkaline solution having a pH of less than 10, wherein said alkaline solution contains a substantially neutral salt;
   (b) injecting a non-condensible gas into said formation to form in-situ foams for mobility control; and
   (c) recovering oil displaced by the alkaline solution and gas.

2. An enhanced oil recovery process according to claim 1 wherein said alkaline solution further comprises a foaming agent.

3. An enhanced oil recovery process according to claim 2 wherein said foaming agent is an alpha olefin sulfonate dimer.

4. An enhanced oil recovery process according to claim 1 wherein said alkaline solution contains an alkaline material selected from the group consisting of sodium sesquicarbonate, sodium carbonate, sodium bicarbonate, and mixtures thereof.

5. An enhanced oil recovery process according to claim 4 wherein said substantially neutral salt is selected from the group consisting of sodium chloride, sodium sulphate, and mixtures thereof.

6. An enhanced oil recovery process according to claim 1 wherein said non-condensible gas is nitrogen.

7. An enhanced oil recovery process according to claim 6 wherein said non-condensible gas is injected concurrently with said alkaline solution.

8. An enhanced oil recovery process according to claim 7 wherein said non-condensible gas is injected alternately with said alkaline solution.

9. An enhanced oil recovery process for formations that have been subjected to steam flooding, said process comprising:
   (a) injecting into said formation a sodium sesquicarbonate solution having a pH of less than 10, wherein said sesquicarbonate solution contains a substantially neutral sodium chloride salt and an alpha olefin sulfonate dimer foaming agent;
   (b) injecting a nitrogen gas into said formation to form in-situ foams for mobility control; and
   (c) recovering oil displaced by the sesquicarbonate solution and gas.

* * * * *